J. ASPINWALL
Centrifugal Sugar-Machine.
No. 26,007.
Patented Nov. 8, 1859.
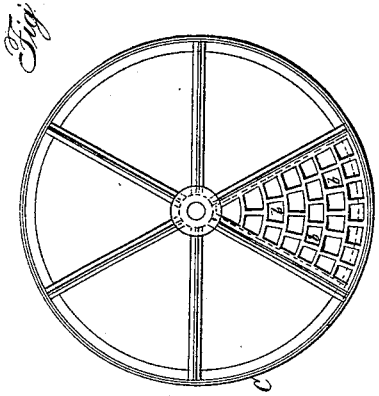
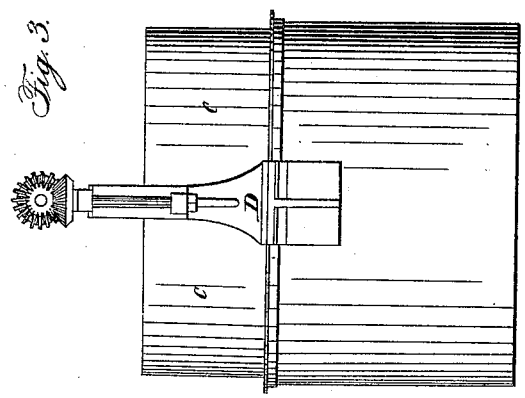
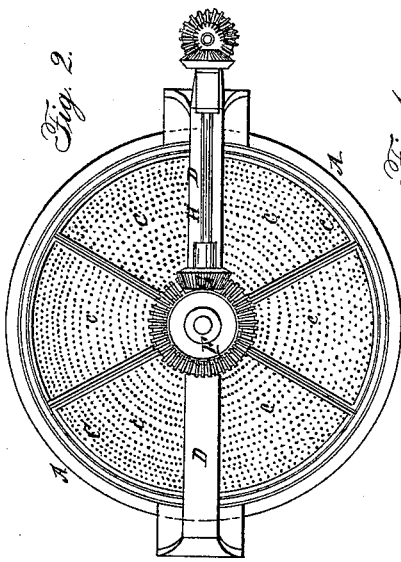
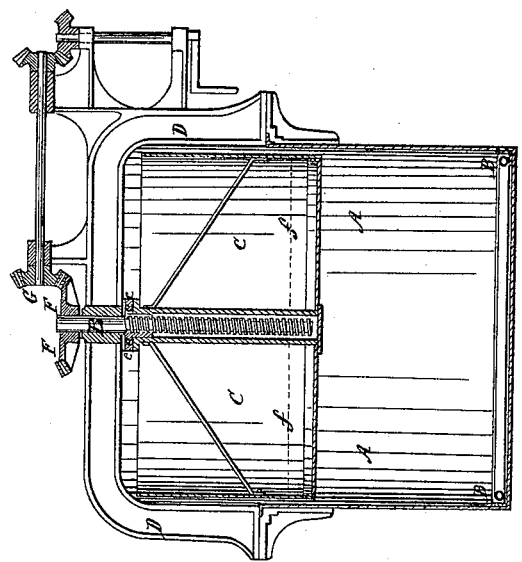
Witnesses:
Inventor:

UNITED STATES PATENT OFFICE.

JOHN ASPINALL, OF GREAT TOWER STREET, LONDON, ENGLAND.

IMPROVEMENT IN REFINING SUGAR.

Specification forming part of Letters Patent No. 26,007, dated November 8, 1859.

*To all whom it may concern:*

Be it known that I, JOHN ASPINALL, of Great Tower Street, in the city of London, England, civil engineer, have invented Improvements in the Refining of Sugar; and I do hereby declare that the following is a full and exact description thereof, reference being had to the accompanying drawings, and to the figures and letters marked thereon.

Figure 1 is a vertical section of the apparatus employed. Fig. 2 is a top or plan view. Fig. 3 is an end view or elevation; and similar letters indicate similar parts in all the figures.

My invention has reference to that part of the process known technically as "blowing up"—that is, the melting of the raw sugar. Various means are now employed for effecting this, the most approved being by the use of an open pan containing perforated steam-pipes in the bottom. Into this pan the water, blood, and sugar are introduced, and steam turned on until the sugar is fully melted. The blood rises to the surface, with other matters, in the form of scum, and may be thence removed by skimming. The principal objection to this process is that the sugar, being of greater specific gravity than the water, falls at once to the bottom before being melted, and by coming into contact with the steam or steam-pipes becomes carbonized, whereby not only is the proportion of treacle increased, but the color of the sugar is also impaired.

The purpose of my improvement is to obviate this objectionable action; and it consists in a method of so effecting the melting that it shall have taken place before the sugar can come into contact with the heating-surfaces. The manner in which I prefer to cause the melting will be as follows:

At A in the accompanying drawings is shown a melting-pan of ordinary construction, having its appropriate steam-pipes, B, for heating the water and boiling the melted sugar, as is usual. Within this pan is placed another vessel, C, which has a perforated bottom, c, and which vessel is so arranged that it may be readily raised out of or lowered into the pan A. This may be effected by suspending the vessel C from a suitable frame-work, as D, by means of a shaft, E, the upper end of which passes through the said frame, and the lower portion, having a thread upon it, works in a nut, e, bolted to the vessel C, as shown in Fig. 1. The screw-shaft E is surrounded by a tube in the vessel C to keep it from becoming clogged, and motion is given to its upper end by means of the gearing F and G and shaft H. The perforated bottom of the vessel C may be copper plates thickly pierced with small holes, and for strength these should rest upon a net-work, as at b, Fig. 4. The sides of the vessel C may be also perforated, if desired.

The operation will be thus: The pan A being filled with water to about the line f, and the steam being turned on, place the raw sugar in the vessel C, and lower said vessel so far into the water that the water will come a few inches above its bottom, as shown in Fig. 1. The melting now commences, and the mass in C settles down until all the sugar is dissolved in the water. When all has been melted, the vessel C may be lowered to the bottom of the pan by means of the screw-shaft, and although the subsequent treatment of the sugar forms no part of my present invention, I recommend that where blood is required it should now be introduced, and the liquor and blood boiled sufficiently to cause the coagulation of the albumen. If, then, the vessel C be raised out of the liquor, it will be found to take up on its bottom the greater part of the scum. Some sugars do not melt very readily, and with such the process may be hastened by employing a second perforated bottom for the vessel C, placing it a short distance above that already described, and having the perforations in this one somewhat larger than in the bottom c. The level of the water should of course be maintained in this, also, above the level of the upper plate. Thus it will be seen that the melting of all the sugar takes place at the surface, whereby none of it can come into contact with the heated surfaces until it is in the state of liquor or solution, and in this condition it is not injured by such contact.

The practice of dissolving saline and other soluble substances by their immersion in water in perforated cases or vessels is very common; but such is not claimed as the novelty of this my invention, which consists in the following statement of my claim.

I claim—

The method herein described of effecting the blowing up or melting of raw sugars—that is to say, by so supporting or upholding the sugar that successive portions will be brought into contact with the water, whereby the sugar will be melted at or near the surface—for the purposes and substantially in the manner set forth.

JOHN ASPINALL.

Witnesses:
  H. D. REED,
  I. C. NEWBURN,
    *Both of* 166 *Fleet Street, London.*